US007176947B2

(12) United States Patent
Kudo et al.

(10) Patent No.: US 7,176,947 B2
(45) Date of Patent: Feb. 13, 2007

(54) DEVICE FOR DRIVING A DISPLAY APPARATUS

(75) Inventors: Yasuyuki Kudo, Fujisawa (JP); Kazuo Okado, Kokubunji (JP); Hiroki Aizawa, Chigasaki (JP)

(73) Assignee: Renesas Technology Corp., Tokyo (JP)

( * ) Notice: Subject to any disclaimer, the term of this patent is extended or adjusted under 35 U.S.C. 154(b) by 617 days.

(21) Appl. No.: 10/715,519

(22) Filed: Nov. 19, 2003

(65) Prior Publication Data

US 2004/0155848 A1 Aug. 12, 2004

(30) Foreign Application Priority Data

Feb. 7, 2003 (JP) ............... 2003-030279

(51) Int. Cl.
*G09G 5/10* (2006.01)
(52) U.S. Cl. .................... 345/690; 345/89; 345/211
(58) Field of Classification Search ............... 345/89, 345/94, 99, 204, 211–213, 690
See application file for complete search history.

(56) References Cited

U.S. PATENT DOCUMENTS

| | | | | |
|---|---|---|---|---|
| 4,751,502 A | * | 6/1988 | Ishii et al. ............... | 345/1.1 |
| 5,874,933 A | * | 2/1999 | Hirai et al. ............... | 345/89 |
| 6,181,313 B1 | * | 1/2001 | Yokota et al. ............ | 345/100 |
| 6,806,860 B2 | * | 10/2004 | Saito et al. ............... | 345/98 |
| 6,940,516 B1 | * | 9/2005 | Dotson .................... | 345/537 |
| 7,088,370 B1 | * | 8/2006 | Dotson et al. ............ | 345/546 |
| 7,098,902 B2 | * | 8/2006 | Tamura ................... | 345/204 |
| 2003/0142037 A1 | * | 7/2003 | Pinedo et al. ............ | 345/1.1 |

* cited by examiner

*Primary Examiner*—Richard Hjerpe
*Assistant Examiner*—Kimnhung Nguyen
(74) *Attorney, Agent, or Firm*—Antonelli, Terry, Stout & Kraus, LLP.

(57) ABSTRACT

There is provided a device for driving a display apparatus. A data line drive section is common to a main screen and a sub-screen, supplies to the main screen gray scale voltages corresponding to display data from CPU, and supplies to the sub-screen a gray scale voltage corresponding to black or white data during a vertical blanking period of the main screen. A scan line drive section scans the main screen, and also scans the sub-screen during the vertical blanking period of the main screen.

15 Claims, 13 Drawing Sheets

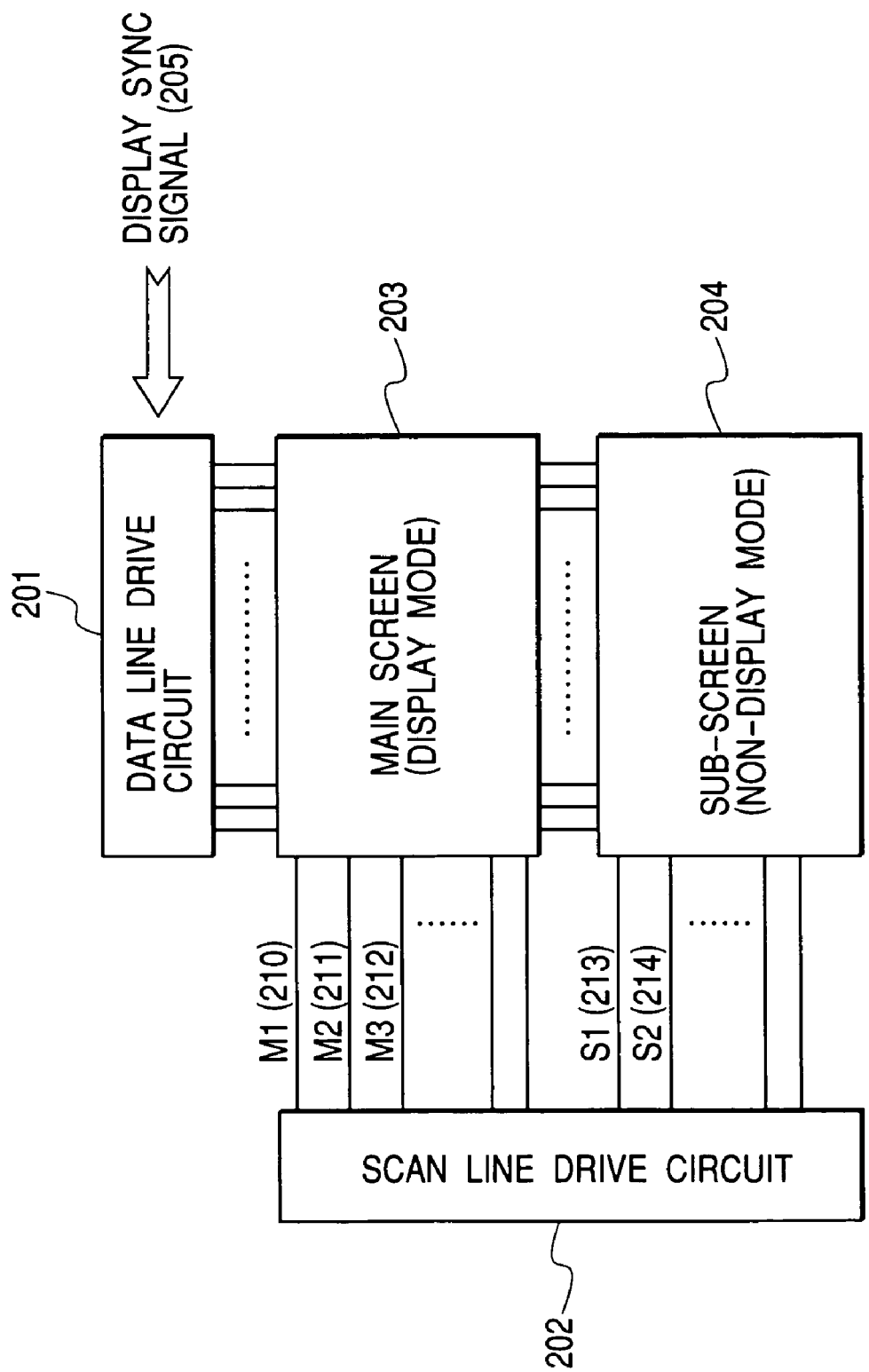

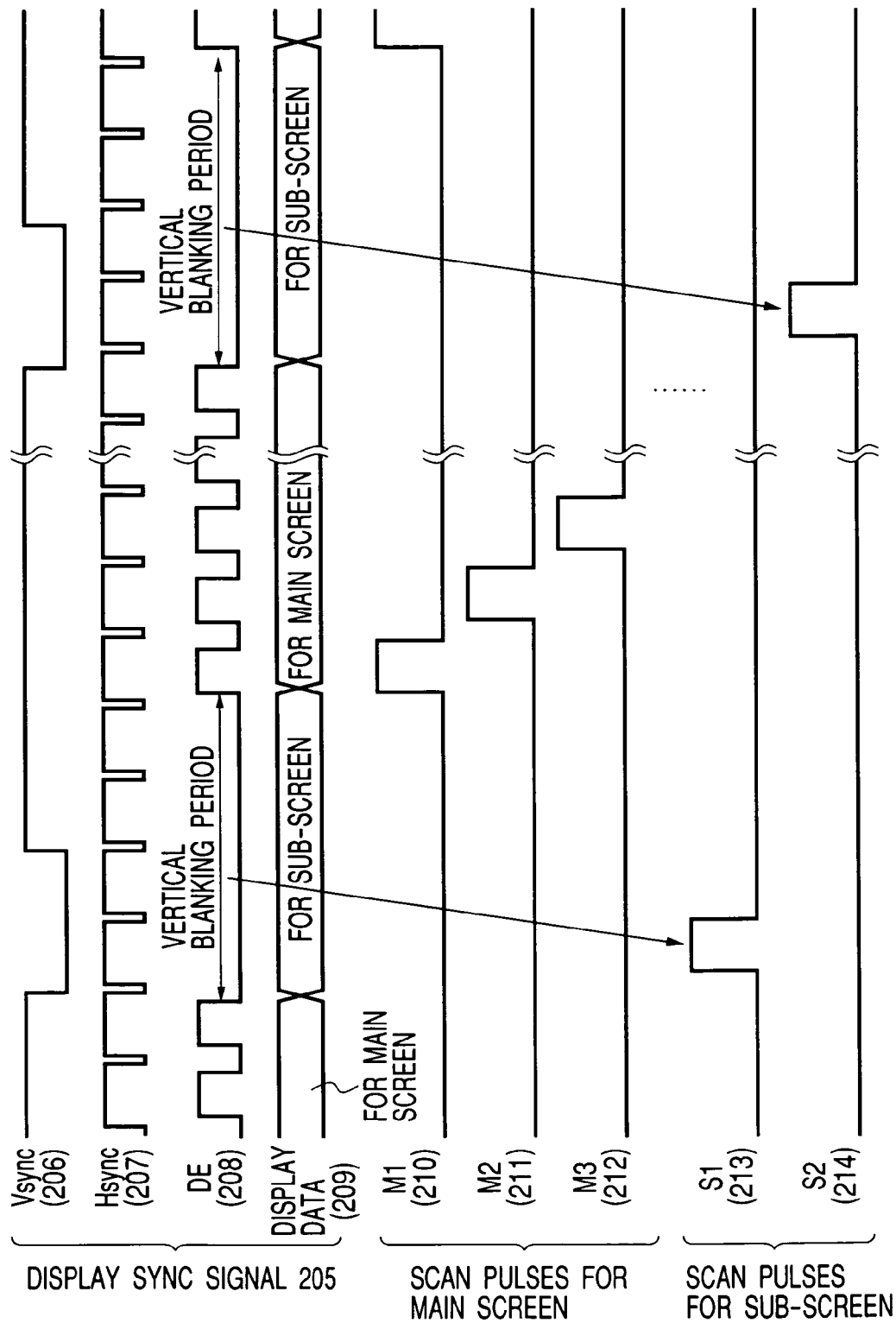

FIG. 4

| CONTROL REGISTER ADDRESS (HEX) | 16-BIT DATA ||||||||||||||||
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| 10h | * | * | * | * | * | * | * | * | * | * | * | * | * | * | * | DS |
| 11h | * | * | * | * | * | * | * | * | * | * | * | * | * | * | * | 0 |
| | SL7 | SL6 | SL5 | SL4 | SL3 | SL2 | SL1 | SL0 | ML7 | ML6 | ML5 | ML4 | ML3 | ML2 | ML1 | ML0 |
| 12h | 0 | 1 | 1 | 0 | 0 | 0 | 0 | 0 | 1 | 0 | 1 | 1 | 0 | 0 | 0 | 0 |
| | * | * | * | * | * | * | * | * | BL7 | BL6 | BL5 | BL4 | BL3 | BL2 | BL1 | BL0 |
| 13h | * | * | * | * | * | * | * | * | 0 | 0 | 0 | 0 | 0 | 1 | 0 | 0 |

DS = SIGNAL FOR SELECTING DISPLAY-MODE SCREEN,
MS = SIGNAL REPRESENTING NUMBER OF DRIVE LINES IN MAIN SCREEN,
SL = SIGNAL REPRESENTING NUMBER OF DRIVE LINES IN SUB-SCREEN,
BL = SIGNAL REPRESENTING NUMBER OF LINES IN VERTICAL BLANKING PERIOD,
* = UNESTABLISHED

| | DS ||
|---|---|---|
| ESTABLISHED VALUE | 0 | 1 |
| OPERATION OF DRIVE CIRCUIT | MAIN SCREEN IS IN DISPLAY MODE (SUB-SCREEN IS IN NON-DISPLAY MODE) | SUB-SCREEN IS IN DISPLAY MODE (MAIN SCREEN IS IN NON-DISPLAY MODE) |

DEVICE FOR DRIVING A DISPLAY APPARATUS

BACKGROUND OF THE INVENTION

The present invention relates to an LSI (Large Scale Integrated Circuit) used in a display apparatus for driving a plurality of display panels (a plurality of display areas).

Some conventional techniques are explained in the following.

U.S. Patent Application Publication No. 2001/0052887 A1 (which corresponds to JP-A-2001-356746) discloses a technique for generating a partial display such that a display is generated in a portion of an entire display area of a display panel. In the driving of a liquid crystal display panel or the like provided with pixels arranged in a matrix comprising n rows and m columns, when a partial-display instruction is issued, respective rows in a partial display area of s rows and m columns selectable within the matrix of the n rows and the m columns are sequentially selected and have desired partial display data written thereinto during one frame period. A desired background data such as an OFF-display (a white display) data is written into a background area other than the partial display area. Only a portion of k rows and m columns in the background area is selected and has the background display data written thereinto during one frame period. The k rows to be selected are shifted on successive frames. The entire background area is selected once per time interval of an (n–s)/k of the frame period. In writing of the background display data, a polarity of the voltage written into the background area is inverted with respect to a reference voltage at intervals of a specified time to ensure the ac driving of pixels in the background area by using the OFF-display data.

U.S. Pat. No. 6,396,469 B1 (which corresponds to JP-A-11-109921) discloses a display device in which two separate data line drivers drive two pixel arrays independently of each other. Controlling means is provided so that, in a given term during a given frame period for displaying one image, for displaying the image on a liquid crystal panel, gate line driving means 2 is controlled so as to select a gate line in each of the first and second pixel arrays, first and second data line driving means 4a, 4b are controlled so as to supply an image signal for displaying the image to first and second data line groups, and further, in another term other than the given term during the given frame period, the gate line driving means 2 is controlled so as to select the gate line again in each of the first and second pixel arrays, and the first and second data line driving means 4a, 4b are controlled so as to supply a non-image image signal having a specified voltage and different from the image signal to the first and second data line groups.

U.S. Pat. No. 5,670,970 (which corresponds to JP-A-7-175448) discloses a liquid crystal display device in which one driving means drives two liquid crystal panels. The liquid crystal display device includes first and second XY matrix type liquid crystal panels in which each of pixels is provided with a switching element and a storage device and a liquid crystal drive device for supplying video signals to the first and second liquid crystal panels such that polarities of the video signals are inverted with a specified period and polarities of the two video signals applied to the first and second liquid crystal panels simultaneously with each other are opposite from each other.

In the technique disclosed in the above-cited U.S. Patent Application Publication No. 2001/0052887 A1, no consideration is given to driving two display panels.

In the technique disclosed in the above-cited U.S. Pat. No. 6,396,469 B1, no consideration is given to driving two pixel arrays with one data line drive circuit.

In the technique disclosed in the above-cited U.S. Pat. No. 5,670,970, no consideration is given to supplying two liquid crystal panels with video signals separate from each other.

SUMMARY OF THE INVENTION

It is an object of the present invention to provide an LSI (Large Scale Integrated circuit) used for a display apparatus, and capable of driving a plurality of display panels separately from each other by using a common circuit, and reducing power consumption.

In the present invention, a data line drive circuit is configured so as to supply gray scale voltages corresponding to display data for both a main screen and a sub-screen, a scan line drive circuit is configured so as to drive the drive lines of both the main screen and sub-screen. Consequently, the present invention makes it possible to drive the two screens as if one screen were driven, by using one data-line drive circuit and one scan-line drive circuit.

Further, in a case in which one of the two screens is in a non-display mode, by receiving display sync signals for a screen in a display mode (for example, the main screen) only, the non-display mode screen (for example, the sub-screen) is scanned during a vertical blanking period of the received display sync signals.

In the present invention, since the scan frequency of the display panel in a non-display mode among a plurality of display panels becomes extremely low, the power consumption of the LSI used in a display apparatus for driving a plurality of display panels can be reduced.

Further, in the present invention, since part or all of the gray-scale voltage generating circuit is ceased in a case in which the display panel is not scanned, the power consumption of the LSI used in a display apparatus for driving a plurality of display panels can be reduced.

BRIEF DESCRIPTION OF THE DRAWINGS

FIG. 2A is a block diagram of a first embodiment of the present invention, and FIG. 2B is a timing chart illustrating driving timing in the first embodiment of the present invention.

FIG. 4 is a diagram illustrating contents of a control register 312 in the first embodiment of the present invention.

DETAILED DESCRIPTION OF THE PREFERRED EMBODIMENTS OF THE INVENTION

A configuration of a display apparatus in accordance with a first embodiment of the present invention will be explained by reference to FIGS. 1A–9.

Figure 1A:
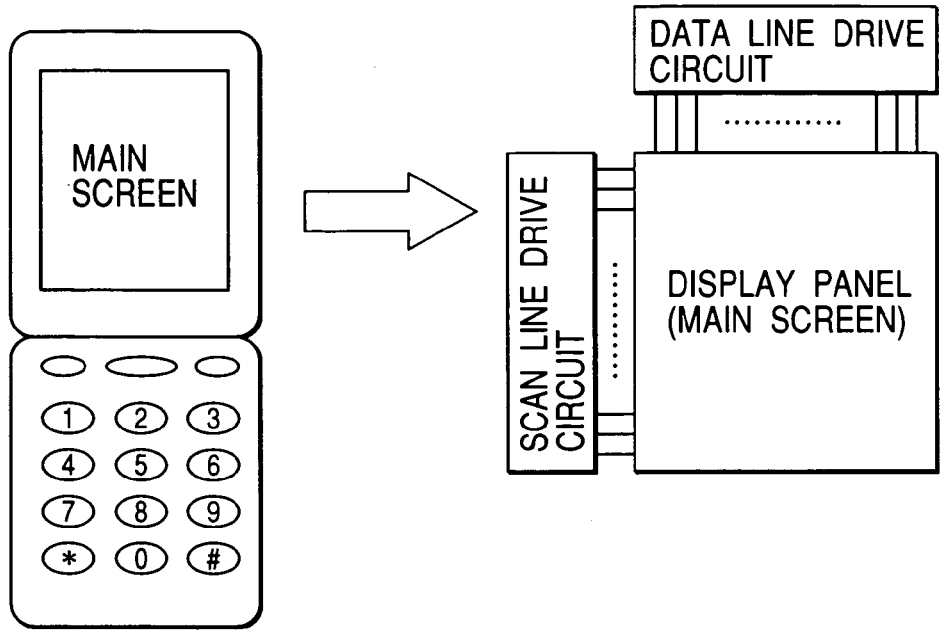
FIGS. 1A and 1B are schematic illustrations of a folding-type mobile phone provided with two screens in accordance with the present invention.
Figure 1B:
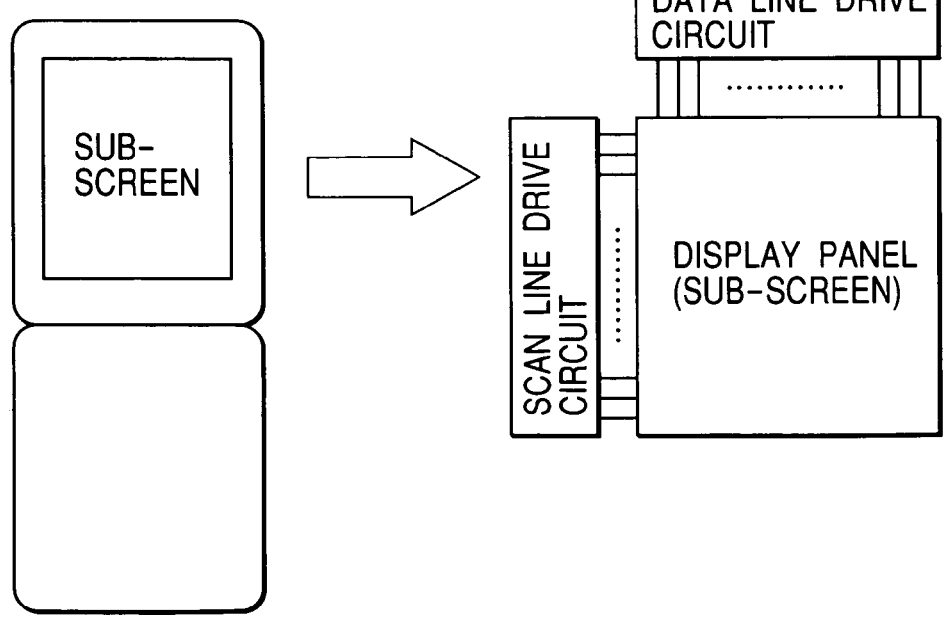

FIGS. 1A and 1B are schematic illustrations of a folding-type mobile phone provided with two screens. One of the two screens is used as a main screen (an internal large screen) used for inputting phone numbers and characters, and establishing various conditions of the mobile phone, as illustrated in FIG. 1A, and the other of the two screens is used as a sub-screen (an external small screen) for displaying information even when the mobile phone is in a folded state as illustrated in FIG. 1B. For the purpose of reducing the power consumption of the mobile phone provided with such two screens to the utmost, the display condition of the mobile phone is controlled such that the sub-screen is in a non-display mode while the main screen is used, and when the mobile phone is in awaiting (folded) state, a display is provided on the sub-screen with the main screen being in a non-display mode. Further, a common LSI is used as both a data line drive circuit for driving the main screen and a data line drive circuit for driving the sub-screen. On the other hand, two separate LSI's are used as a scan line drive circuit for scanning the main screen and a scan line drive circuit for scanning the sub-screen, respectively.

An outline of operation of the present embodiment will be explained by reference to FIGS. 2A and 2B. In FIG. 2A, reference numeral 201 denotes a data line drive circuit, 202 is a scan line drive circuit, 203 is a main screen, and 204 is a sub-screen. In this case, both the two screens are formed of TFT liquid crystal panels. Data lines are used for both the main screen 203 and the sub-screen 204 in common, and the scan line drive circuit 202 is configured so as to drive the drive lines of both the main screen 203 and the sub-screen 204. Therefore, the pair of the drive circuits 201 and 202 can drive the two screens.

In FIG. 2A, assume that the main screen is in a display mode and the sub-screen is in a non-display mode. Display sync signals and display data 205 which are necessary for displaying images on the main screen 203 are transferred from external equipment. The display sync signals and display data 205 includes a vertical sync signal (hereinafter called vsync), a horizontal sync signal (hereinafter called Hsync), a data enable signal (hereinafter called DE), a dot clock (hereinafter called CLK), and display data, which have signal waveforms denoted by reference numerals 206–209, respectively, in FIG. 2B, but except that a signal waveform of CLK is not shown in FIG. 2B.

Vsync 206 is a vertical sync signal for representing a frame period (a period required for displaying (scanning) one picture), and in this embodiment the frequency of Vsync is set at 60 Hz. Hsync 207 is a horizontal sync signal for representing a horizontal scan period. DE 208 is a data enable signal such that the display data is made valid when this data enable signal is a "high" level. Here, the DE 208 signal is at a "low" level during a time interval corresponding to several scan lines once per frame period, and this time interval is call a vertical blanking period.

Assume that data for the sub-screen in a non-display mode is transferred as the display data 209 during the vertical blanking period, and that display data for the main screen is transferred as the display data 209 during the time other than the vertical blanking period.

As an example, assume that the display data for the main screen contains 16-bit color information (5 bits for red, 6 bits for green and 5 bits for blue) per pixel, and assume that the data for the screen in a non-display mode is a fixed data so as to minimize power consumption in the screen, and in this embodiment, is a black data (all of the red, green and blue components are 0's.). In this case, a low-brightness data may be instead of the black data.

Next, the timing in driving of the two screens will be explained. In FIG. 2B, reference numeral 210 denotes a scan pulse for the first line of the main screen, and 211 and 212 are scan pulses for driving the second and third lines of the main screen, respectively. In this way, since the main screen is in a display mode, each successive scan pulse is applied to the main screen per scan period. On the other hand, since the sub-screen is in a non-display mode, each successive scan pulse does not need to be applied to the sub-screen per scan period. However, in a case when a liquid crystal panel display is used, since liquid crystal material has a characteristic such that it deteriorates when a dc voltage component is applied across it for a long period of time, the liquid crystal panel needs to be ac-driven by applying scan pulses even during the non-display mode.

For solving this problem, each line or each group of plural (two or three) lines of the sub-screen in the non-display mode may be driven once during a different vertical blanking period of the main screen by generating a scan pulse for the sub-screen during each blanking period of the main screen, as shown in FIG. 2B. Reference numeral denotes a scan pulse for the first line of the sub-screen 204, 214 is a scan pulse for the second line of the sub-screen 204, and each of the two scan pulses is generated during a corresponding vertical blanking period of the main screen. In a case when one group of plural lines of the sub-screen is driven once during one vertical blanking period, all of the plural lines of the one group may be driven at the same time, or the plural lines of the one group may be driven line by line successively during the one vertical blanking period.

With the above configuration, the operating frequency of the scan pulse in the main screen is equal to the frame frequency of 60 Hz, and on the other hand, in the sub-screen, since one line is scanned during one vertical blanking period of the main screen, the operating frequency of the scan pulse is reduced to ⅟60 Hz, and consequently, low power consumption is realized by driving the non-display mode screen at a low frequency. Incidentally, during the vertical blanking period of the main screen, the main screen changes to the non-display mode.

The following will explain the details of means for the above-described low-power driving in accordance with the present invention.

Figure 3:
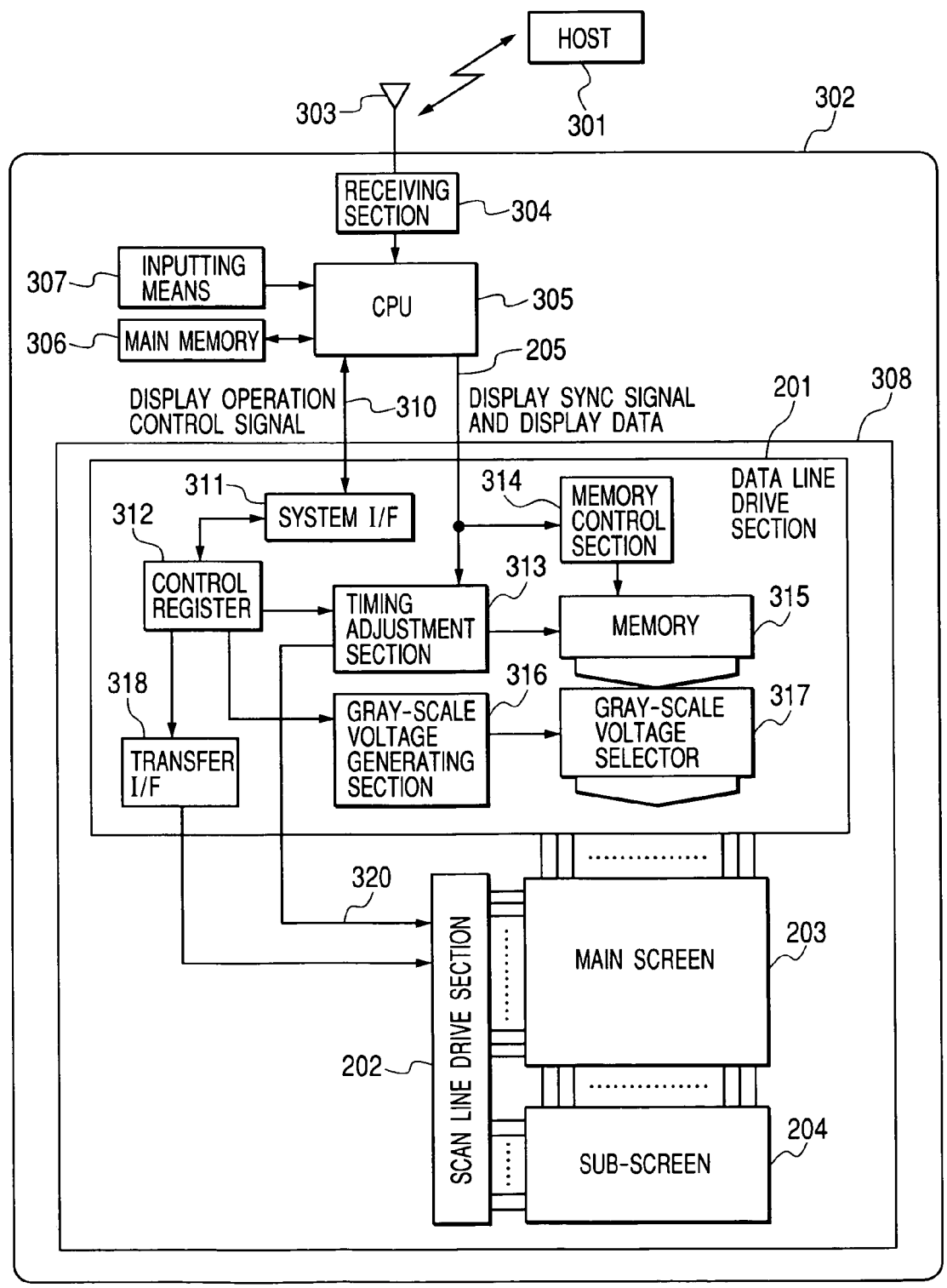
FIG. 3 is a block diagram of a mobile phone employing a display apparatus in accordance with the present invention.

FIG. 3 illustrates a configuration in which the display apparatus of the present invention is applied to a mobile phone. In FIG. 3, reference numeral 301 denotes a host station, and 302 is a mobile phone. The main elements of the mobile phone 302 are an antenna 303, a transmitting and receiving section 304, a CPU 305, a main memory 306, an input section 307, and a display section 308. The main elements of the display section 308 are a data line drive circuit 201, a scan line drive circuit 202, a main screen 203, and a sub-screen 204. The data line drive circuit 201 comprises a system interface 311, a volatile control register 312, a timing adjustment section 313, a memory control section 314, a memory 315, a gray-scale voltage generating section 316, a gray-scale voltage selector 317, and a scan drive circuit interface 318. In this embodiment, the two screens are provided, and the number of the screens may be increased to three.

The CPU 305 in the mobile phone 302 is an LSI for controlling various operations of the mobile phone 302. In controlling of the screens, display sync signals and display data 205 are outputted so that information received from the host station 301 or image data stored in the main memory 306 in advance is displayed on the screens. Here, two kinds of the display sync signals and the display data 205 are provided for the main screen and the sub-screens, respectively, and for example, the display sync signals and the display data 205 for the main screen 203 and the sub-screen 204 are outputted, when the mobile phone is in open and folded states, respectively. By way of example, this operation is realized by providing a switch configured so as to be turned ON when the mobile phone is folded, and selecting a proper output based upon the judgment by the CPU 305 of the state of a signal from the switch. Further, the CPU 305 also outputs a display operation control signal 310 for controlling the internal operations of the data line drive circuit 201 and the scan line drive circuit 202, in addition to the display sync signal and display data 205. The details of signal timing and others in the system interface 311 are explained in the above-cited publications, and therefore, although the explanation of the details are omitted here, the outline of the operation is such that instructions (data of the operation control signal 310) are issued from the CPU 305, then are stored in a control register within drivers, and the operation within the drivers is determined.

For the purpose of realizing a method of driving two screens in accordance with the present invention, provided in the present embodiment are four kinds of instructions, the number of lines in the main screen (hereinafter called ML), the number of lines in the sub-screen (hereinafter called SL), the number of lines during the vertical blanking period (hereinafter called BL), and information (hereinafter called DS) on which of the two screens to be brought into a display mode, in addition to the instructions disclosed in the above-cited publications.

By way of example, FIG. 4 shows which addresses of the control register 312 the above-described instructions are stored in. In an example shown in FIG. 5, to facilitate the subsequent explanation, ML, SL, BL and DS are described as ML=176 (in decimal notation), SL=96 (in decimal notation), BL=4 (in decimal notation), and DS=0 (in binary notation).

Figure 5:
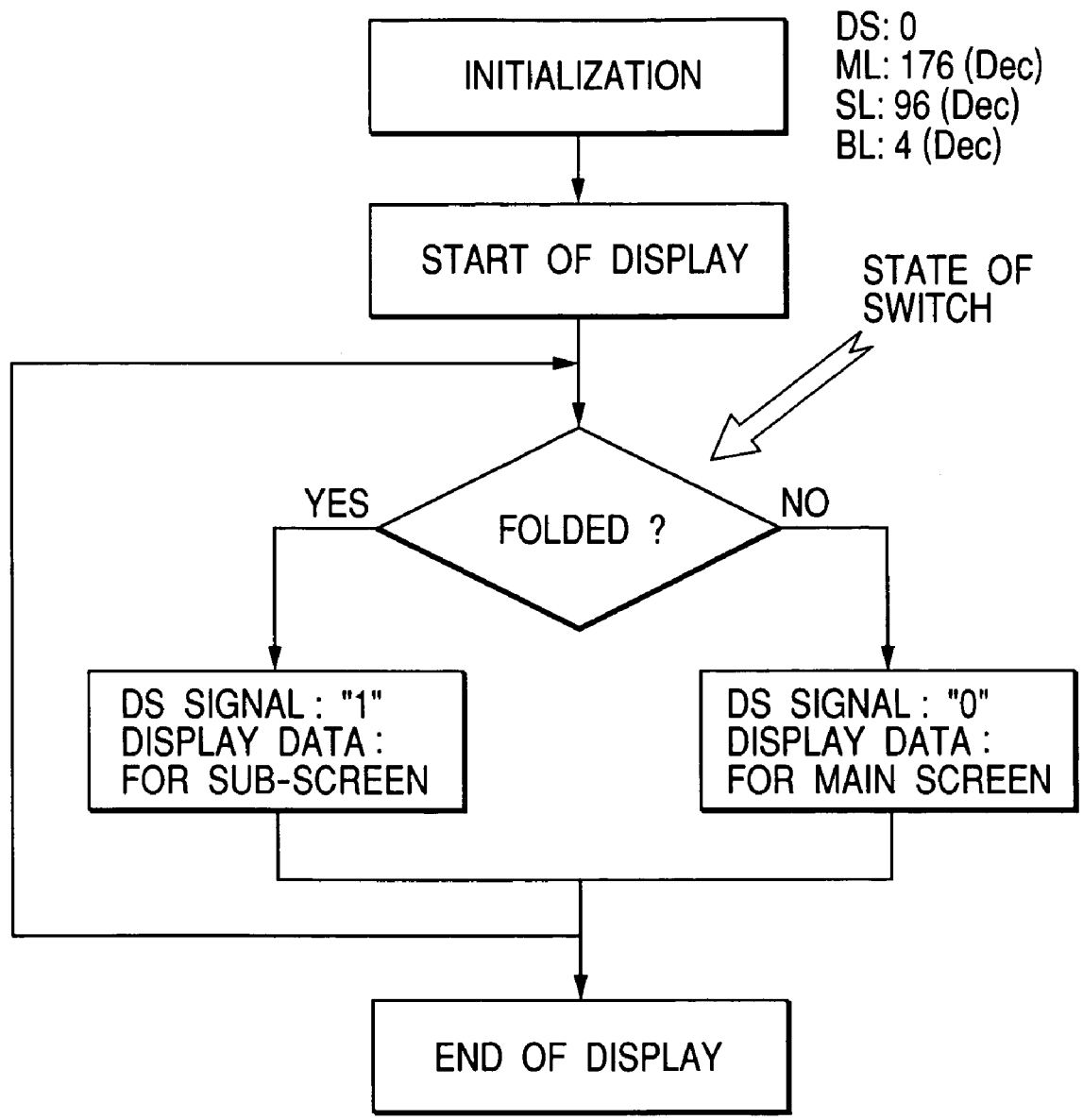
FIG. 5 is an illustration of a sequence for issuing instructions in the first embodiment of the present invention.

In the sequence of issuing the above-described instructions to the control register 312, as shown in FIG. 5, initially issuance of all the four kinds of instructions is carried out at the time of initialization prior to display operation. Thereafter, a determination of which of the two screens to be brought into a display mode is made based upon use of the mobile phone, and a change in the transfer of the display sync signal and display data 205 is made in accordance with the above determination. As explained previously as an example, this change can be realized by providing a switch configured so as to be turned ON when the mobile phone is folded, and controlling based upon the judgment by the CPU 305 of the state of a signal from the switch. The initialization is performed each time power for the data line drive circuit 201 is turned on.

The following explains the operation of the data line drive circuit 201 and the scan line drive circuit 202 after the above-described instructions have been stored in the control register 312.

Consider a case in which condition data as shown in FIG. 4 have been stored. Since the DS signal is "0", the main-screen display mode (the sub-screen non-display mode) is established. In this case, the display sync signal 205 for the main screen is inputted to the memory control section 314, and display data are written into a specified address of the memory 315. The addressing in this case is such that the addressing is reset to the first address based upon Vsync to correspond to a display position of the screen, and data are written successively in a lateral direction in synchronism with the dot clocks during a time interval when DE is "high," and this operation is repeated in succeeding lines successively based upon Hsync. The "black" data for the non-display mode screen transferred during a time interval when DE is "low" are written starting from a time corresponding to a line next to the last line for writing the display data for the display operation.

Figure 6:
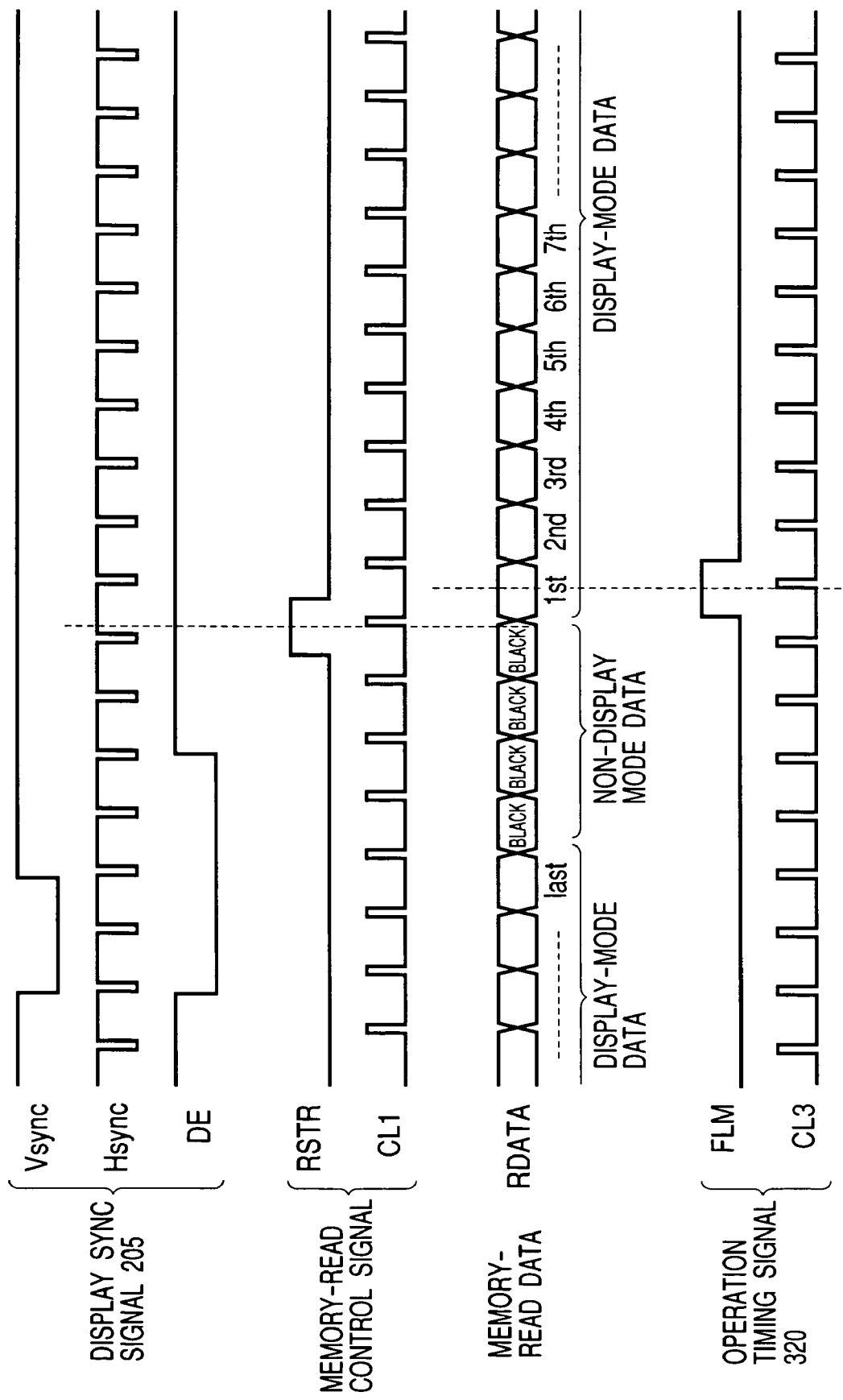
FIG. 6 is a timing chart illustrating the operation of a timing adjustment section 313 in the first embodiment of the present invention.

The timing adjustment section 313 receives the display sync signal 205 and thereby generates a read control signal for the memory 315 and an operation timing signal 320 for the scan line drive circuit. Timing charts for these two signals are shown in FIG. 6. In FIG. 6, RST denotes a reset signal for setting an address at the first position, and CL1 is a read sync signal. Read data RDATA corresponding to one line are outputted from the memory 315 at a time, successively line by line, based upon these clocks. The operation timing signal 320 includes FLM indicating the first line, and CL3 indicating outputting timing of the scan pulse. The above-described signals are easily generated by logic circuits based upon the display sync signal 205 inputted, and therefore the explanation of details of the circuit configurations is omitted.

The gray-scale voltage generating circuit 316 is a circuit block for generating the number of levels of gray scale voltages corresponding to display data. For example, in this example, since green data is formed of 6 bits as explained previously, the number of the levels is 64.

The gray-scale voltage selector 317 selects one from among a plurality of gray-scale voltage levels generated by the gray-scale voltage generating circuit 316, in accordance with RDATA read from the memory 315, and outputs the selected one as a gray-scale voltage. With the above-explained operation, the gray scale voltages to be outputted are outputted at a time in synchronism with CL1. After completion of all the gray scale voltages for the display section, a gray scale voltage corresponding to a black data is outputted. Then this operation is repeated after returning to the first line.

The transfer interface 318 is a block for transferring a portion of the data stored in the control register 312 to the scan line drive circuit 202.

Figure 7:
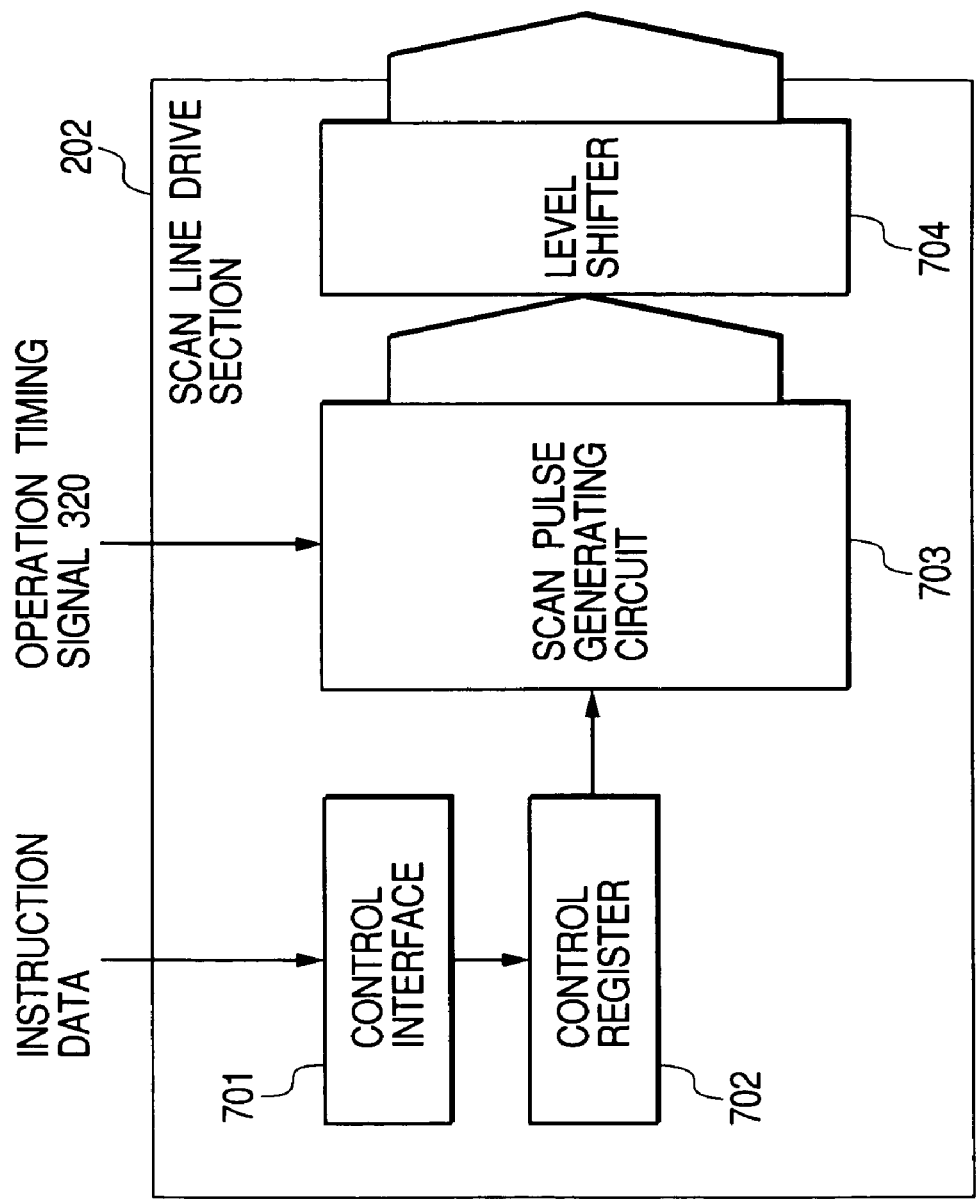
FIG. 7 is a block diagram illustrating a configuration of a scan line drive section 202 in the first embodiment of the present invention.
Figure 8:
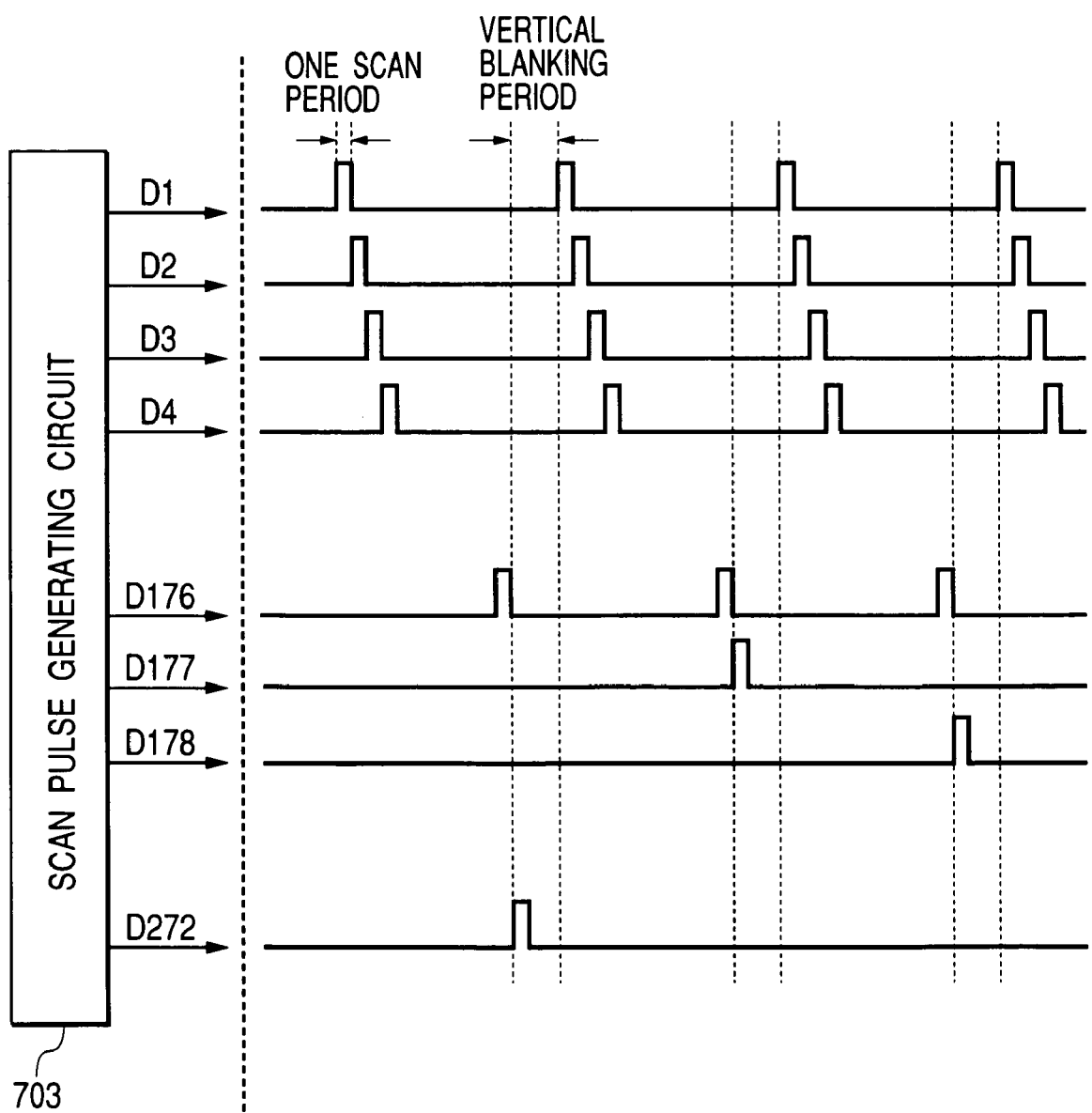
FIG. 8 is a timing chart illustrating the operation of a scan pulse generating circuit 703 in the first embodiment of the present invention.

Next, the configuration and operation of the scan line drive circuit 202 are explained by reference to FIG. 7. The scan line drive circuit 202 comprises a control interface 701, a control register 702, a scan pulse generating circuit 703, and a level shifter 704. The control interface 701 performs operation of receiving instruction data transferred from the transfer interface 318, and then storing them in the control register 702. Here, the instruction data includes the four kinds of instructions, ML, SL, BL and DS, which constitute the features of the present invention.

The scan pulse generating circuit 703 is a block for determining which output terminal a scan pulse is outputted to and which timing the scan pulse is outputted at, based upon the above-mentioned four kinds of the instruction data stored in the control register 702 and the operation timing signal 320 transferred from the timing adjustment section 313.

By way of example, in a case in which ML=176 (in decimal notation), SL=96 (in decimal notation), BL=4 (in decimal notation), and DS=0 (in binary notation), as described previously, lines D1 to D176 are provided for the main screen, and lines D177 to 272 (=176+96) are provided for the sub-screen. The level shifter 704 level-shifts signals for the lines D (D signals) outputted from the scan pulse generating circuit 703, then outputs the signals to the lines of each of the screens. A measure of the amount of the level shifts is such that a "high" level of the D signal is a voltage level sufficient to turn ON a TFT (Thin Film Transistor), and a "low" level of the D signal is a voltage level low enough to turn OFF the TFT.

As explained above, for example, the data line drive circuit 201 applies gray scale voltages to the main screen 203 in the display mode in accordance with the display data, and gray scale voltages corresponding to a black data to the sub-screen 204 in the non-display mode. On the other hand, the scan line drive circuit 202 drives the main screen 203 successively line by line during each scan period, and drives the sub-screen 204 during each vertical blanking period. With this configuration, the non-display screen can be driven at a low frequency.

Consequently, the present embodiment is capable of driving the main screen and the sub-screen with low power consumption without increasing the number of components, the space occupied by the components, the cost and others.

Further, although the TFT liquid crystal panels are used for the screens in the first embodiment of the present embodiment, the present invention is not limited to the TFT liquid crystal panels, but also is applicable to other kinds of screens such as organic EL displays, for example.

Further, although, in the first embodiment of the present invention, the non-display mode screen is driven one line at a time during each vertical blanking period, the present invention is not limited to this configuration, but the non-display mode screen can be driven plural lines at a time during each vertical blanking period.

Further, although, in the first embodiment of the present invention, the non-display mode screen is configured so as to display a black data in the normally black mode, the present invention is not limited to this configuration. For example, when a liquid crystal panel of the normally white mode is employed, generally the power consumption would be made lower by using a white data. Therefore, in the case of the liquid crystal panels of the normally white mode, it is preferable to use a white data. However, a high-brightness data may be used instead of the white data.

Further, the first embodiment of the present invention is easily applicable to the so-called partial display mode.

Further, since the display sync signal and display data 205 in the first embodiment of the present invention are transferred continuously in a raster-scan fashion, the memory 315 constituting the data line drive circuit 202 does not always need to have a capacity for the entire screen area. For example, a buffer for one line can be employed instead.

Figure 9:
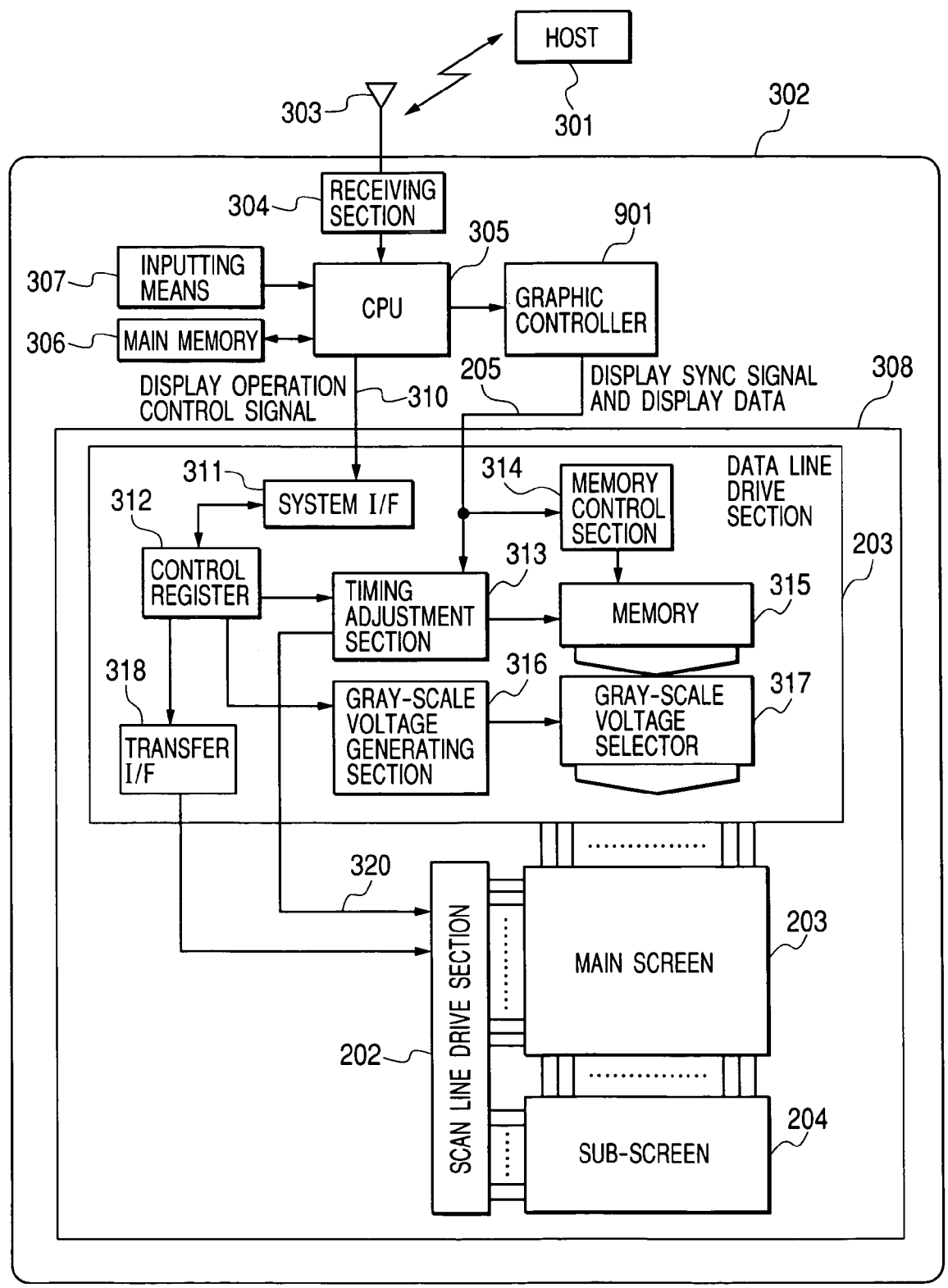
FIG. 9 is a block diagram illustrating a modification of the first embodiment of the present invention.

Further, the display sync signal and display data 205 in the first embodiment of the present invention may be generated and transferred by a graphic controller 901 as shown in FIG. 9.

Next, a display apparatus in accordance with a second embodiment of the present invention will be explained by reference to FIGS. 10 to 12. In the above-explained first embodiment of the present invention, the low power consumption is realized by reducing the driving frequency of one of the two screens in the non-display mode extremely. In addition to this, the second embodiment of the present invention provides a method of reducing power consumed in the gray-scale voltage generating section, and considered is a case in which on one occasion only one of the two screens produces display, and on another occasion the two screens produce images at the same time.

Figure 10:
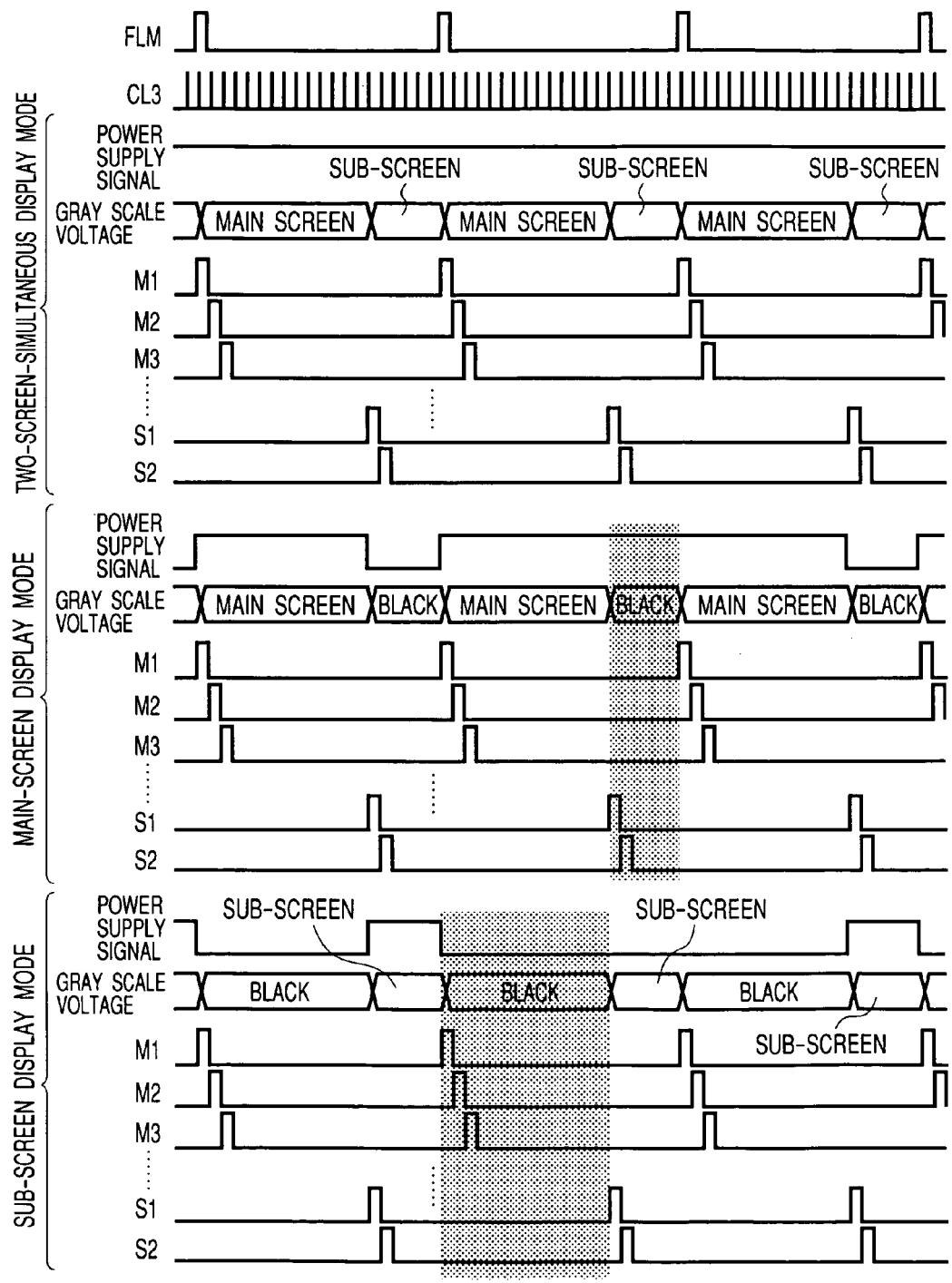
FIG. 10 is a timing chart illustrating the operation of a second embodiment of the present invention.

The following explains the features of the second embodiment of the present invention by reference to timing charts shown in FIG. 10. In FIG. 10, FLM denotes a signal indicating the first line of the screen, and CL3 is a signal indicating an output timing of the scan pulse, as in the case of the first embodiment of the present invention. A power supply signal is a signal for controlling the gray-scale voltage generating section, the gray-scale voltage generating section operates when the power supply signal is "High," and the gray-scale voltage generating section does not operate when the power supply signal is "Low." The gray scale voltages are at voltage levels corresponding to the display data outputted by the data line drive section. M1 is a scan pulse for driving the first line of the main screen, and M2 and M3 are scan pulses for driving the second and third lines of the main screen, respectively. On the other hand, S1 is a scan pulse for driving the first line of the sub-screen, and S2 is a scan pulse for driving the second line of the sub-screen.

First, in the case of a two-screen-simultaneous display mode, the power supply signal is "High" at all times, and gray scale voltages for the sub-screen are outputted following the outputting of gray scale voltages for the main screen. In synchronism with this, the scan pulse for the sub-screen is outputted successively for each one scan period, following the scan pulses for the main screen. That is to say, in the two-screen-simultaneous display mode, the main screen and the sub-screen are driven as if they were formed as one continuous screen.

Next, in the case of a main-screen display mode, the power supply signal during the display period of the sub-screen is basically "Low". However, the power supply signal becomes "High" during the display period of the sub-screen every plural frame periods as represented by a shaded area in FIG. 10, and the gray scale voltage for this display period of the sub-screen is selected to be a voltage level corresponding to such a display data (for example, a black data) as to minimize power consumption. In synchronism with this, the scan pulse for the sub-screen is outputted every plural frame periods, while the scan pulse for the main screen is outputted every frame period. In the case of a sub-screen display mode, the above-described relationship is reversed.

As explained above, in the display apparatus in accordance with the second embodiment, the gray-scale voltage generating section consumes power only during a time interval when the display screen is driven, and consequently, the display apparatus of this embodiment is capable of achieving an advantage of reducing power consumption in the gray-scale voltage generating section.

Figure 11:
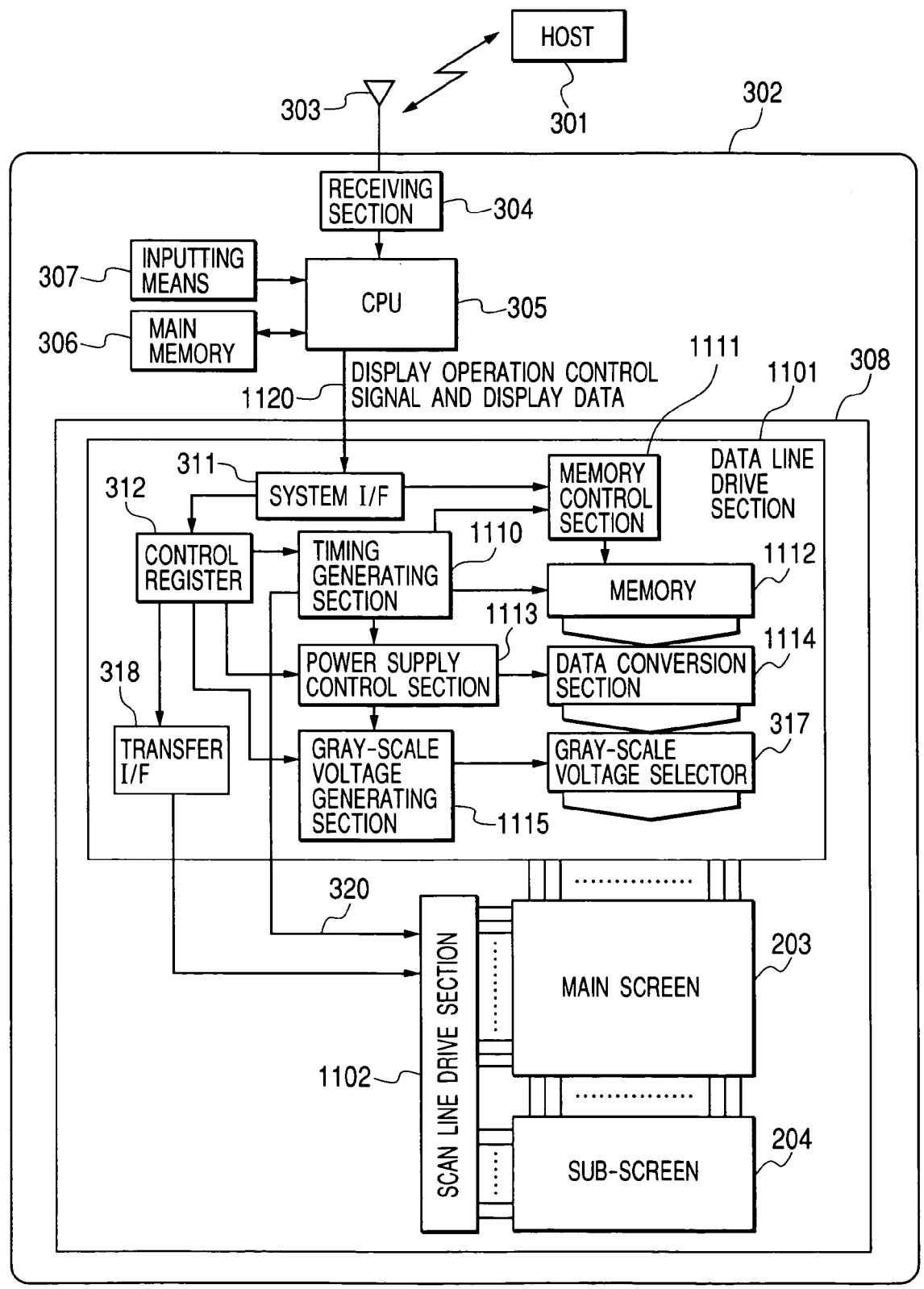
FIG. 11 is a block diagram illustrating a configuration of the second embodiment of the present invention.

FIG. 11 is a block diagram of a configuration of a case in which the display apparatus of the second embodiment of the present invention is applied to a mobile phone. In FIG. 11, reference numeral 1101 denotes a data line drive section, 1102 is a scan line drive section, 1110 is a timing generating section, 1111 is a memory control section, 1112 is a memory, 1113 is a power supply control section, 1114 is a data converter section, 1115 is a gray-scale voltage generating section, and 1120 is a display control signal and display data. The remaining blocks are similar to those in the case of the first embodiment of the present invention, and therefore they are denoted by the same reference numerals as in the case of the first embodiment of the present invention.

A main change made in the data line drive section 1101 is that the display sync signals are not supplied from the CPU, but FLM and CL3 are generated internally within the data line drive section. The reason for this is that, if the display sync signals are supplied externally, then there arises a need for a vertical blanking period corresponding to the number of lines in the sub-screen, and consequently, the control becomes complicated. The display data are transferred from CPU by using the system interface explained in connection with the first embodiment of the present invention, and are stored in the memory 1112. The memory 1112 is provided with a memory capacity capable of storing data for both the main screen and the sub-screen, and therefore the display apparatus is capable of both the two-screen-simultaneous display mode and the one-screen display mode without transferring display data from external equipment.

The timing generating section 1110 is a block for internally generating the above-described FLM and CL3, and RST and CL1 which are memory read control signals. The contents of these signals are similar to those in the case of the first embodiment of the present invention. The internal generation of the signals is carried out most easily by frequency-diving outputs from an built-in oscillator.

The memory control section 1111 performs operation of writing display data supplied from the system interface 311 into specified addresses.

On the other hand, the reading operation is such that read data RDATA corresponding to one line are outputted from the memory 1112 at a time, successively line by line, based upon RST and CL1 generated by the timing generating section 1110, in the order of from the data for the main screen to those for the sub-screen. When the power supply signal generated by the subsequently explained power supply control section 1113 is "Low," the read data are converted into "black data" in the data converter section 1114, and then are transferred to the gray-scale voltage selector 317.

The power supply control section 1113 generates and outputs the power supply signal with the timing shown in FIG. 10 in the various display modes of the main screen and the sub-screen. This operation can be realized by supplying the control register 312 with instructions from CPU including information on the number of lines in the main screen and the sub-screen, selection between the display and non-display modes, and the number of frame periods between two successive driving of a non-display screen, and then by using a logic circuit using these data, RST and CL1.

Figure 12:
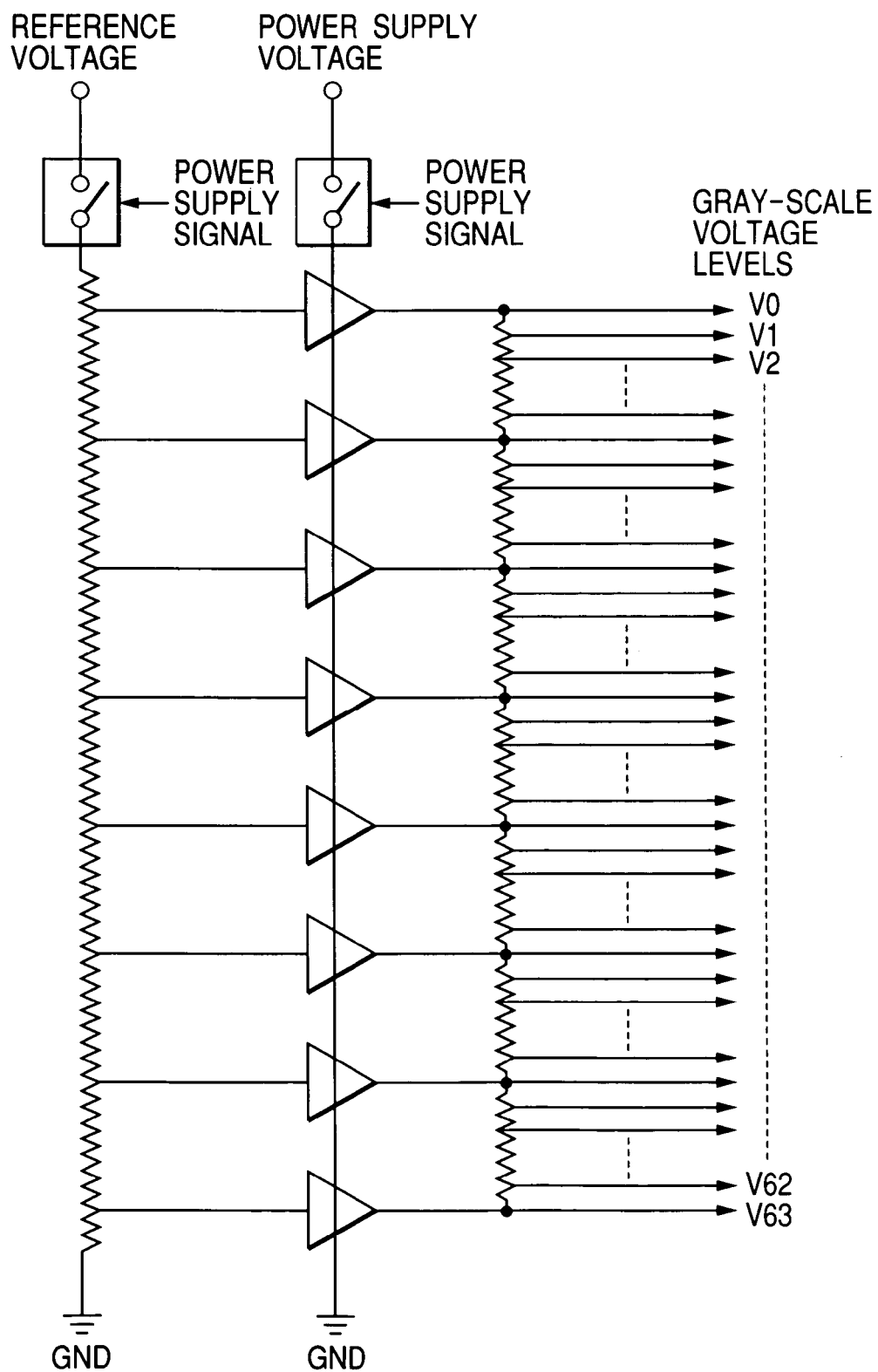
FIG. 12 is an illustration for explaining a configuration of a gray-scale voltage generating section 1115 in the second embodiment of the present invention.

The gray-scale voltage generating section 1115 is a block for generating the number of levels of gray-scale voltages corresponding to the display data as in the case of the first embodiment of the present invention, and is formed of string resistors, op-amps (Operational Amplifiers) and switches, for example, as shown in FIG. 12.

The operation of the gray-scale voltage generating section 1115 is as follows:

When the power supply signal is "High," the switches are turned ON, the power is supplied to each of the op-amps, and thereby a plurality of gray scale voltages are generated.

On the other hand, when the power supply signal is "Low," the switches are turned OFF, the supply of the power to each of the op-amps is ceased and the dc current flowing through the string resistors is ceased, and consequently, the power consumption in the gray-scale voltage generating section 1115 is reduced to zero. However, when the power supply signal is "High," the power may be supplied to the op-amps and string resistors for generating a gray scale voltage (the minimum voltage) corresponding to a black data only, without supplying the power to all the op-amps, thereby ceasing the supply of the power to the op-amps and string resistors for other gray scale voltages.

The configuration and operation of the remaining blocks are similar to those in the case of the first embodiment of the present invention, and therefore the explanation of those is omitted.

The above-described display apparatus in accordance with the second embodiment of the present invention is capable of reducing the power consumption in the gray-scale voltage generating section, in addition to the advantage of low power consumption achieved by lowering extremely the driving frequency for the screen in the non-display mode of the two screens.

In the second embodiment of the present invention, the display in the screen in the non-display mode is configured so as to provide a black display, the present invention is not limited to this configuration. For example, in a case in which a liquid crystal panel of the normally white mode is used, generally the power consumption can be made lower by using a white data for the screen in the non-display mode.

Further, the second embodiment of the present invention is easily applicable to the so-called partial display mode.

Further, although the TFT liquid crystal panels are used for the screens in the second embodiment of the present embodiment, the present invention is not limited to the TFT liquid crystal panels, but also is applicable to other kinds of screens such as organic EL displays, for example.

Further, although the display sync signals are generated internally within the display apparatus in the second embodiment of the present invention, the present invention is not limited to this configuration, but the second embodiment of the present invention can be modified such that the similar signals are generated outside the display apparatus, and are transferred to the display apparatus.

Further, of course it is possible to impart both the two functions of the display apparatuses of the first and second embodiments to one display apparatus.

In accordance with the present invention, in the display apparatus in which two separate screens are driven by using data lines common to the two separate screens, when one of the two screens is in a display mode, a scan frequency for the other of the two screens in a non-display mode can be made extremely low, and consequently, the low power consumption can be achieved. Since the scan pulse for driving the screen in the non-display mode can be generated from display signals for the screen in a display mode transferred from external equipment, there is no need for special control of the external equipment, resulting in ease of use.

Further, in accordance with the present invention, since it is possible to make the drive circuit section in an operating condition only during a time interval when the display screen is driven, the low power consumption in the drive circuit section can also be achieved.

The present invention provides an advantage of preventing degradation of the display element because the display panel in the non-display mode has applied thereto gray scale voltages corresponding to a black or white data.

What is claimed is:

1. A device for driving a display apparatus having a plurality of display panels, said device comprising:

an interface circuit for receiving display data from an external processor; and a control register for storing drive-line-number information on a number of drive lines provided in each of said plurality of display panels, and panel-selection information for selecting one of said plurality of display panels for said display data to be displayed on, wherein said interface circuit receives said drive-line-number information and said panel-selection information from said external processor prior to driving of said selected display panel, and said control register stores said drive-line-number information and said panel-selection information prior to the driving of said selected display panel in response to a demand from said external processor.

2. A device according to claim 1, further comprising:

a gray-scale voltage generating circuit for generating a plurality of gray scale voltages; and a gray-scale voltage selector for selecting one from among said plurality of gray scale voltages in accordance with said display data, and outputs said selected gray scale voltage to said selected display panel via a corresponding one of data lines common to said plurality of display panels, wherein said gray-scale voltage selector outputs said selected gray scale voltage to said selected display panel in accordance with said display data, and outputs a gray scale voltage corresponding to one of black and white data to at least one unselected display panel of said plurality of display panels not selected by said panel-selection information during a vertical blanking period of said selected display panel.

3. A device according to claim 2, wherein, prior to the driving of said selected display panel, said interface circuit receives vertical-blanking-period information which is intended for said at least one unselected display panel during said vertical blanking period of said selected display panel, from said external processor, and prior to the driving of said selected display panel, said control register stores said vertical-blanking-period information in response to a demand from said external processor.

4. A device according to claim 3, wherein said interface circuit receives said vertical-blanking-period information from said external processor during the driving of said selected display panel, and said control register replaces said vertical-blanking-period information which is previously stored with said vertical-blanking-period information which is newly received, during the displaying of said selected display panel in response to a demand from said external processor.

5. A device according to claim 2, wherein said device further comprises a data converter circuit for converting a data from said external processor into one of said black and white data and outputting said one of said black and white data to said gray-scale voltage selector during said vertical blanking period of said selected display panel.

6. A device according to claim 2, wherein said interface circuit receives said panel-selection information from said external processor during the displaying of said selected display panel, and said control register replaces said panel-selection information which is previously stored with said panel-selection information which is newly received, during the displaying of said selected display panel in response to a demand from said external processor.

7. A device according to claim 2, wherein said gray-scale voltage generating circuit ceases to operate during a time interval when none of said plurality of display panels are not scanned by said scan line drive circuit.

8. A device for driving a display apparatus having a display panel composed of a plurality of display regions, said device comprising:

an interface circuit for receiving display data from an external processor; and a control register for storing drive-line-number information on a number of drive lines provided in each of said plurality of display regions, and region-selection information for selecting one of said plurality of display regions for said display data to be displayed on, wherein said interface circuit receives said drive-line-number information and said region-selection information from said external processor for each power turn-on of said device, and said control register stores said drive-line-number information and said region-selection information in response to a demand from said external processor for said each power turn-on of said device.

9. A device according to claim 8, further comprising:

a gray-scale voltage generating circuit for generating a plurality of gray scale voltages; and a gray-scale voltage selector for selecting one from among said plurality of gray scale voltages in accordance with said display data, and outputs said selected gray scale voltage to said selected display region via a corresponding one of data lines common to said plurality of display regions, wherein said gray-scale voltage selector outputs said selected gray scale voltage to said selected display region in accordance with said display data, and outputs a gray scale voltage relatively lower among said plurality of gray scale voltages to at least one unselected display region of said plurality of display regions not selected by said region-selection information during a vertical blanking period of said selected display region.

10. A device for driving a display apparatus having a main screen and a sub-screen, said device comprising:

an interface circuit for receiving display data from an external processor;

a gray-scale voltage generating circuit for generating a plurality of gray scale voltages;

a gray-scale voltage selector for selecting ones from among said plurality of gray scale voltages in accordance with said display data, and outputs said selected gray scale voltages to said main screen and sub-screen via data lines common to said main screen and sub-screen, wherein, in a first case in which said main screen is brought into a display mode and said sub-screen is brought into a non-display mode in compliance with an instruction from said external processor, said gray-scale voltage selector outputs said selected gray scale voltages to said main screen via said data lines, and outputs a gray scale voltage relatively lower among said plurality of gray scale voltages to said sub-screen; and in a second case in which said main screen is brought into a non-display mode and said sub-screen is brought into a display mode in compliance with an instruction from said external processor, said gray-scale voltage selector outputs said selected gray scale voltages to said sub-screen via said data lines, and outputs a gray scale voltage relatively lower among said plurality of gray scale voltages to said main screen.

11. A device according to claim 10, wherein said relatively lower gray scale voltage is a gray scale voltage corresponding to one of black and white data.

12. A device according to claim 10, wherein, in said first case in which said main screen is brought into a display mode and said sub-screen is brought into a non-display mode in compliance with an instruction from said external processor, said gray-scale voltage selector outputs said selected gray scale voltages to said main screen via said data lines, and outputs a gray scale voltage relatively lower among said plurality of gray scale voltages to said sub-screen during a vertical blanking period of said main screen; and in said second case in which said main screen is brought into a non-display mode and said sub-screen is brought into a display mode in compliance with an instruction from said external processor, said gray-scale voltage selector outputs said selected gray scale voltages to said sub-screen via said data lines, and outputs a gray scale voltage relatively lower among said plurality of gray scale voltages to said main screen during a vertical blanking period of said sub-screen.

13. A device according to claim 12, further comprising a first scan line drive circuit for scanning said main screen, a second scan line drive circuit for scanning said sub-screen, and a timing generating circuit for generating timing signals for scanning said main screen and sub-screen and for outputting said timing signals to said first and second scan line drive circuits, wherein, in said first case in which said main screen is brought into a display mode and said sub-screen is brought into a non-display mode in compliance with an instruction from said external processor, said second scan line drive circuit scans said sub-screen in synchronism with said timing signals during said vertical blanking period of said main screen, and in said second case in which said main screen is brought into a non-display mode and said sub-screen is brought into a display mode in compliance with an instruction from said external processor, said first scan line drive circuit scans said main screen in synchronism with said timing signals during said vertical blanking period of said sub-screen.

14. A device according to claim 12, further comprising a first scan line drive circuit for scanning said main screen, a second scan line drive circuit for scanning said sub-screen, and a timing generating circuit for generating timing signals for scanning said main screen and sub-screen and for outputting said timing signals to said first and second scan line drive circuits, wherein, in said first case in which said main screen is brought into a display mode and said sub-screen is brought into a non-display mode in compliance with an instruction from said external processor, a frequency at which said first scan line drive circuit scans one picture on said main screen is higher than a frequency at which said second scan line drive circuit scans one picture on said sub-screen; and in said second case in which said main screen is brought into a non-display mode and said sub-screen is brought into a display mode in compliance with an instruction from said external processor, a frequency at which said first scan line drive circuit scans one picture on said main screen is lower than a frequency at which said second scan line drive circuit scans one picture on said sub-screen.

15. A device according to claim 14, wherein, in said first case in which said main screen is brought into a display mode and said sub-screen is brought into a non-display mode in compliance with an instruction from said external processor, said second scan line drive circuit scans one or two lines in said sub-screen each time each time said first scan line drive circuit scans one picture in said main screen; and in said second case in which said main screen is brought into a non-display mode and said sub-screen is brought into a display mode in compliance with an instruction from said external processor, said first scan line drive circuit scans one or two lines in said sub-screen each time each time said second scan line drive circuit scans one picture in said sub-screen.

* * * * *